(12) United States Patent
Pintat et al.

(10) Patent No.: US 11,473,435 B2
(45) Date of Patent: Oct. 18, 2022

(54) TURBINE VANE COMPRISING A PASSIVE SYSTEM FOR REDUCING VORTEX PHENOMENA IN AN AIR FLOW FLOWING OVER SAID VANE

(71) Applicant: SAFRAN AIRCRAFT ENGINES, Paris (FR)

(72) Inventors: Ludovic Pintat, Moissy-Cramayel (FR); Eric Roger Schwartz, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 17/251,510

(22) PCT Filed: Jun. 14, 2019

(86) PCT No.: PCT/FR2019/051446
§ 371 (c)(1),
(2) Date: Dec. 11, 2020

(87) PCT Pub. No.: WO2019/239074
PCT Pub. Date: Dec. 19, 2019

(65) Prior Publication Data
US 2021/0246802 A1    Aug. 12, 2021

(30) Foreign Application Priority Data
Jun. 15, 2018    (FR) ...................... 18 55266

(51) Int. Cl.
*F01D 9/04*    (2006.01)
*F01D 5/14*    (2006.01)

(52) U.S. Cl.
CPC ............ *F01D 9/041* (2013.01); *F01D 5/145* (2013.01); *F05D 2220/323* (2013.01);
(Continued)

(58) Field of Classification Search
CPC ... F01D 9/02; F01D 9/04; F01D 9/041; F01D 9/042; F01D 9/044; F01D 5/145;
(Continued)

(56) References Cited

U.S. PATENT DOCUMENTS 2,291,828 A    8/1942    New
3,846,038 A    11/1974   Carriere et al.
(Continued)

FOREIGN PATENT DOCUMENTS

DE    19524984 A1 *    1/1997    ............ F01D 5/142
EP    1 553 261 A2     7/2005
(Continued)

OTHER PUBLICATIONS

DE19524984A1_MachineTranslation (Gut, R) Jan. 9, 1997. [retrieved on Dec. 8, 2021] Retrieved from: Espacenet (Year: 1997).*
(Continued)

*Primary Examiner* — Woody A Lee, Jr.
*Assistant Examiner* — Elton K Wong
(74) *Attorney, Agent, or Firm* — Oblon, McClelland, Maier & Neustadt, L.L.P.

(57) ABSTRACT

A vane for a turbine engine turbine includes a blade and at least one platform that radially extends the blade, and a system for reducing vortices including at least one circuit including a duct extending from at least one air intake orifice formed in the platform upstream of the leading edge as far as at least one air exhaust slot formed on the trailing edge.

13 Claims, 5 Drawing Sheets

(52) U.S. Cl.
CPC ...... *F05D 2240/12* (2013.01); *F05D 2240/81* (2013.01); *F05D 2270/17* (2013.01)

(58) Field of Classification Search
CPC ........... F05D 2240/12; F05D 2240/121; F05D 2240/122; F05D 2240/81; F05D 2270/17; F05D 2220/323; F04D 29/68; F04D 29/681

See application file for complete search history.

(56) References Cited

U.S. PATENT DOCUMENTS

| | | | |
|---|---|---|---|
| 4,146,352 | A | 3/1979 | Yasugahira et al. |
| 4,534,701 | A | 8/1985 | Wisser |
| 5,711,650 | A | 1/1998 | Tibbott et al. |
| 8,398,364 | B1 | 3/2013 | Liang |
| 2005/0191167 | A1 | 9/2005 | Mongillo, Jr. et al. |
| 2005/0238483 | A1 | 10/2005 | Guemmer |
| 2007/0224033 | A1 | 9/2007 | Mongillo, Jr. et al. |
| 2015/0337664 | A1* | 11/2015 | Cosi .......................... F01D 9/02 415/208.1 |
| 2016/0326885 | A1* | 11/2016 | Lewis ..................... F01D 5/187 |
| 2017/0328206 | A1* | 11/2017 | Auxier ................. F04D 29/542 |
| 2017/0370228 | A1 | 12/2017 | Xu et al. |

FOREIGN PATENT DOCUMENTS

| | | |
|---|---|---|
| FR | 2 166 494 | 8/1973 |
| JP | 55-146201 A | 11/1980 |

OTHER PUBLICATIONS

DE19524984A1_Translation (Gut, R.) Jan. 9, 1997. [received on Jan. 11, 2022] Received from: STIC. (Year: 1997).*

International Search Report dated Sep. 16, 2019 in PCT/FR2019/051446 filed Jun. 14, 2019, 3 pages.

French Search Report (with English translation of categories) dated Oct. 18, 2018 in French Application No. 18 55266 filed on Jun. 15, 2018, 3 pages.

* cited by examiner

TURBINE VANE COMPRISING A PASSIVE SYSTEM FOR REDUCING VORTEX PHENOMENA IN AN AIR FLOW FLOWING OVER SAID VANE

TECHNICAL FIELD

The present invention relates to the field of aircraft turbine engine turbines, and in particular a vane reducing aerodynamic losses.

The invention is particularly applicable to any type of turbine engine, such as for example a turbojet engine or a turboprop engine.

STATE OF THE PRIOR ART

In an aircraft turbine engine, the turbine recovers the energy from the gases compressed in the compressor stages and heated in the combustion chamber, to convert them into mechanical energy.

The turbine comprises mobile wheels and stationary nozzles which are arranged in alternation along the axial direction of the turbine engine, and which each bear a plurality of vanes. These vanes are evenly distributed on the circumference of a disk which bears them and each comprise a blade which extends radially while extended by a platform at the radially internal and external ends of this blade. The nozzle is configured to deflect the air flow so as to effectively supply the following mobile wheel which recovers the energy from this flow traversing it in order to restore it in the movement thereof to the fan and to the compressors of the turbine engine. An example of design of such a turbine is for example known from the document FR 3 034 129 A1.

In the turbine environment, various physical flow phenomena take place around the vanes. So-called "secondary" flows are conventionally observed which are generally presented in the form of vortex structures initiated at the levels of the vane platforms.

In practice, at the level of a row of vanes 1, herein stator 2 referenced in FIG. 1, the air flow from upstream is subject to the combined effect of the potential field P prevailing between two adjacent vanes and oriented from the lower surface 3 to the upper surface 4 of the blades, with a change of direction and velocity induced by the leading edge 6 forming an obstacle. This field P being sufficiently great to deflect the boundary layer of the upstream flow at the level of the platform 7, the appearance of vortices ensues. A distinction is made between so-called "horseshoe" vortices Vh characterised by two contrarotating branches on either side of the vane, a high flow rate passage vortex Vp developing between the channel defined between the vanes, and corner vortices Vs following the connecting lines between the blade and the platforms.

These secondary flows are not oriented in the principal flow direction of the flow flowing over the vanes and therefore do not contribute to supplying energy to the wheel, causing losses of efficiency and an increase in kerosene consumption of the turbine engine.

The aim of the invention is that of providing a vane structure enabling the boundary layer to be removed, marked by a low air propagation rate upstream from the vane, so as to reduce the vortex structures substantially.

DESCRIPTION OF THE INVENTION

For this purpose, the invention relates to a turbine vane for a turbine engine, such as a turbojet engine, comprising:

a blade including a leading edge and a trailing edge and intended to be submerged in an air flow circulating from upstream to downstream from the leading edge to the trailing edge;

at least one platform ending an end of the blade, this platform comprising an air glide face at the interface thereof with the blade;

characterised in that it includes at least one air circulation circuit including:

an air intake opening formed at the level of the glide face in a zone upstream from the leading edge or in a zone corresponding to the upstream half of the blade;

an air discharge opening leading to the leading edge;

an inner conduit connecting the air intake opening to the air discharge opening.

With this solution, the invention thus allows the vortex phenomena taking place around the vane to be limited by isolating therein the boundary layer flowing over the platform to reinject same into the jet at the level of the trailing edge. The invention also relates to a vane thus defined, wherein the inner conduit forms a coil comprising at least one undulation.

The invention also relates to a vane thus defined, wherein the intake openings are orifices, and the air discharge openings are slits.

The invention also relates to a vane thus defined, wherein the inner conduit is configured to discharge air via the air discharge opening along a direction which is within 10° that of the propagation of the air flow along the blade, downstream from the trailing edge.

With this arrangement, the overall efficiency of a turbine equipped with such a vane is optimised.

The invention also relates to a vane thus defined, wherein the inner conduit connects a plurality of air intake openings to an air discharge opening.

The invention also relates to a vane thus defined, wherein the inner conduit connects an air intake opening to a plurality of air discharge openings.

The invention also relates to a vane thus defined, comprising a radially internal platform and a radially external platform, and comprising a first air circulation circuit at the level of the radially internal platform, and a second air circulation circuit at the level of the radially external platform.

The invention also relates to a vane thus defined, obtained by additive manufacturing.

The invention also relates to a turbine for an aircraft turbine engine comprising at least one vane thus defined, the turbine being preferentially a low-pressure turbine.

The invention also relates to a turbine for an aircraft turbine engine comprising at least one vane thus defined, the turbine engine being preferentially a double-body turbine engine.

DETAILED DESCRIPTION OF SPECIFIC EMBODIMENTS

Figure 1:
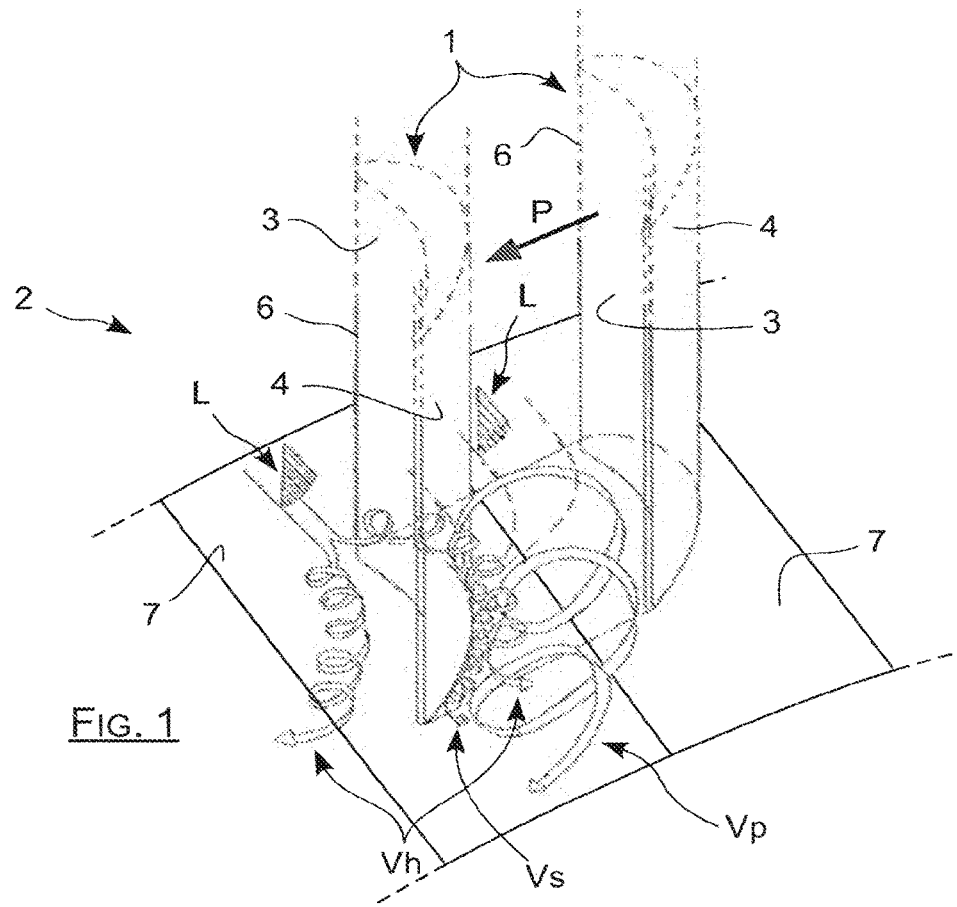
FIG. 1 already described is an illustration of the vortex flow problem caused by a boundary layer detachment at the level of a vane platform.
Figure 2:
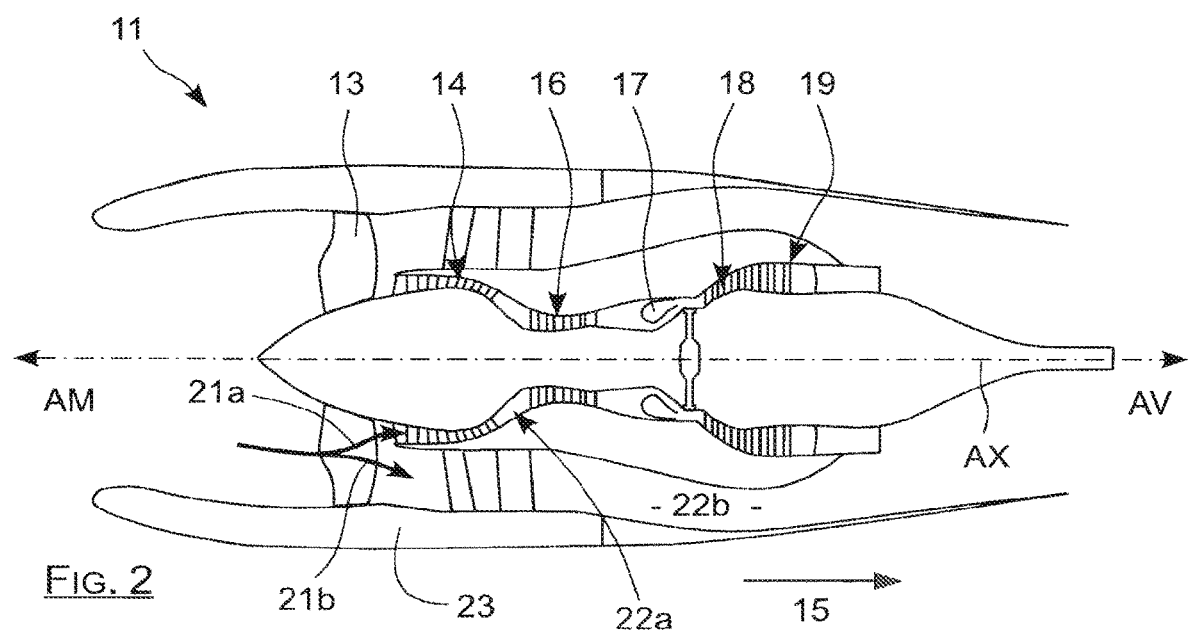
FIG. 2 is a schematic axial cross-sectional view of a dual-flow turbojet engine according to the invention.

With reference to FIG. 2, an aircraft turbine engine 11, according to a preferred embodiment of the invention, is represented. This consists of a dual-flow, double-body turbojet engine. Nevertheless, it could consist of a turbine engine of another type, for example a turboprop engine, without leaving the scope of the invention.

The turbine engine 11 has a longitudinal central axis AX about which the different components thereof extend. It comprises, from upstream AM to downstream AV along a main gas flow direction 15 through this turbine engine, a fan 13, a low-pressure compressor 14, a high-pressure compressor 16, a combustion chamber 17, a high-pressure turbine 18 and a low-pressure turbine 19.

Conventionally, after having traversed the fan, the air is split into a central primary flow 21*a* and a secondary flow 21*b* surrounding the primary flow. The primary flow 21*a* flows into a primary gas circulation path 22*a* through the compressors 14, 16, the combustion chamber 17 and the turbines 18, 19. The secondary flow 21*b* flows for its part into a secondary gas circulation path 22*b* delimited by an engine casing, surrounded by a nacelle 23.

Figure 3:
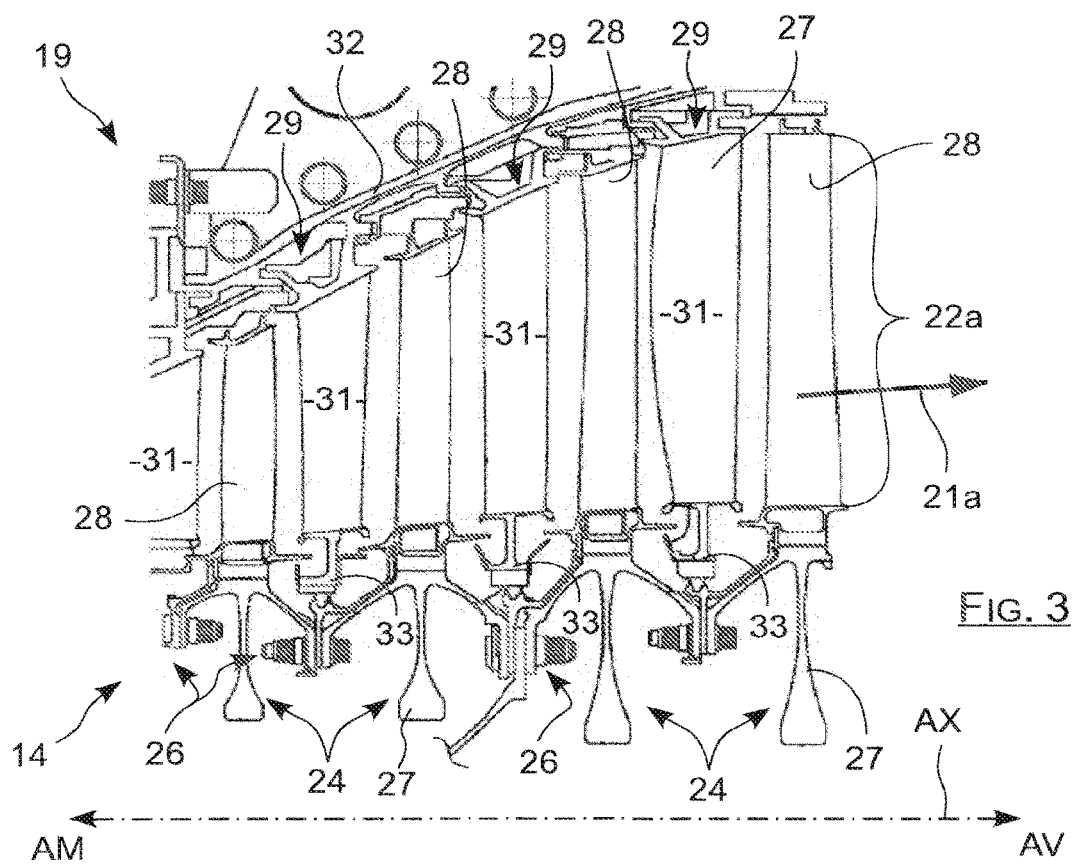
FIG. 3 illustrates a schematic half-view of a turbine engine low-pressure turbine according to the invention.

FIG. 3 represents a part of the low-pressure turbine 19. Nevertheless, the invention could also apply to the high-pressure turbine 18, without leaving the scope of the invention. This low-pressure turbine 19 comprises a plurality of mobile wheels referenced by 24 and four in number by way of example, secured to one another by clamping 26. These mobile wheels 24 each include a disk 27, of axis of revolution AX, bearing a cascade of rotary vanes 28 distributed circumferentially. Between each pair formed of two successive mobile wheels 24, a nozzle 29 comprising an annular row of stationary vanes 31 is positioned. These stationary vanes 31 are mounted at the radially external ends thereof with respect to the axis AX on an external turbine casing 32 surrounding the low-pressure turbine 19, and at the radially internal ends thereof by stationary ferrule sectors 33. In operation, the primary flow 21*a* flows in the primary path 22*a* traversed by the rotary blades 28 which decelerate it by extracting the energy therefrom and the stationary vanes 31 which accelerate it by levelling same.

Figure 4:
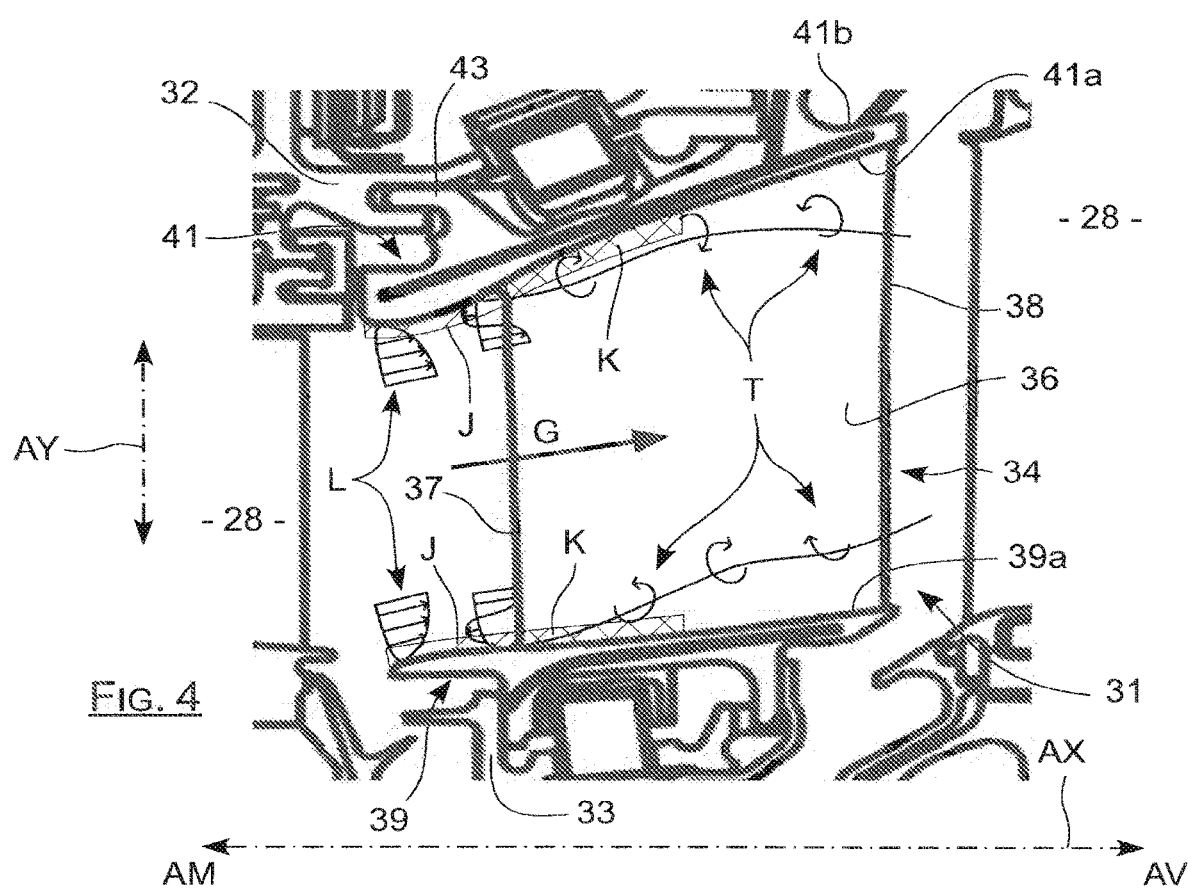
FIG. 4 is a detailed view of a part of the turbine shown in FIG. 3 which illustrates a vortex flow problem.

Hereinafter, reference will be to FIG. 4 representing in detail in an upstream-downstream direction two rotary vanes 28 between which a stationary vane 31 is located. The stationary vane 31 includes a blade 34 extending along a radial direction AY. This blade 34 includes a lower surface wall 36 and an upper surface wall, not visible, which are joined in an upstream region AM of the blade by a leading edge 37 and in a downstream region AV of the blade by a trailing edge 38. Furthermore, the blade 34 is extended on either side of the radial ends thereof by a radially internal platform 39 and a radially external platform 41. These radially internal and external platforms include respectively a lower and upper glide face 39*a* and 41*a* facing one another in the radial direction AY. These glide faces 39*a* and 41*a*, at the interface between the associated platform and the blade, or in other words from which the blade extends, jointly delimit the primary path 22*a*.

The radially external platform 41 particularly includes an upper attachment face 41*b* from which protrude upper protuberances 43 holding the vane on the outer turbine casing 32.

In operation, the primary flow 21*a* which flows in the primary path 22*a* follows an overall propagation direction G. Parts of this flow referenced by L are contiguous to the slide faces 39*a* and 41*a*, also referred to as "boundary layers", and marked by low propagation rates due to friction with these faces. The boundary layers are presented in the form of air jets gliding on one another and following a rectilinear and parallel movement. It is observed that on approaching the leading edge 37, the velocity and pressure fields are disturbed and the jets disappear inducing a disorganised characteristic to this part of the flow, in other words vortex phenomena T, as shown in FIG. 4.

The underlying idea of the invention is that of removing the boundary layer L located in a zone referenced by J upstream from the leading edge or in a zone referenced by K corresponding to the upstream half of the blade, so as to substantially reduce the vortex structures induced by the detachment thereof. This zone K is delimited by the leading edge 37 and an imaginary line located midway between this leading edge and the trailing edge 38 of the blade 34.

In this regard, the main specificity of the invention lies in the addition of a system for reducing vortices forming an integral part of the vane 31. One of the stationary vanes 31 including such a system will be described, but it is noted that the invention as it will be described can apply to the entire row of nozzle vanes 31, or indeed merely some of these vanes. This system for reducing vortices is considered to divert the boundary layer before it is distorted and encounters the leading edge 37 in zone J, or at least moves beyond the zone K, in other words propagates beyond the upstream half of the blade of the vane 31 in the channel defined with the adjacent stationary vane when the stator is fitted on the turbine engine.

Figure 5:
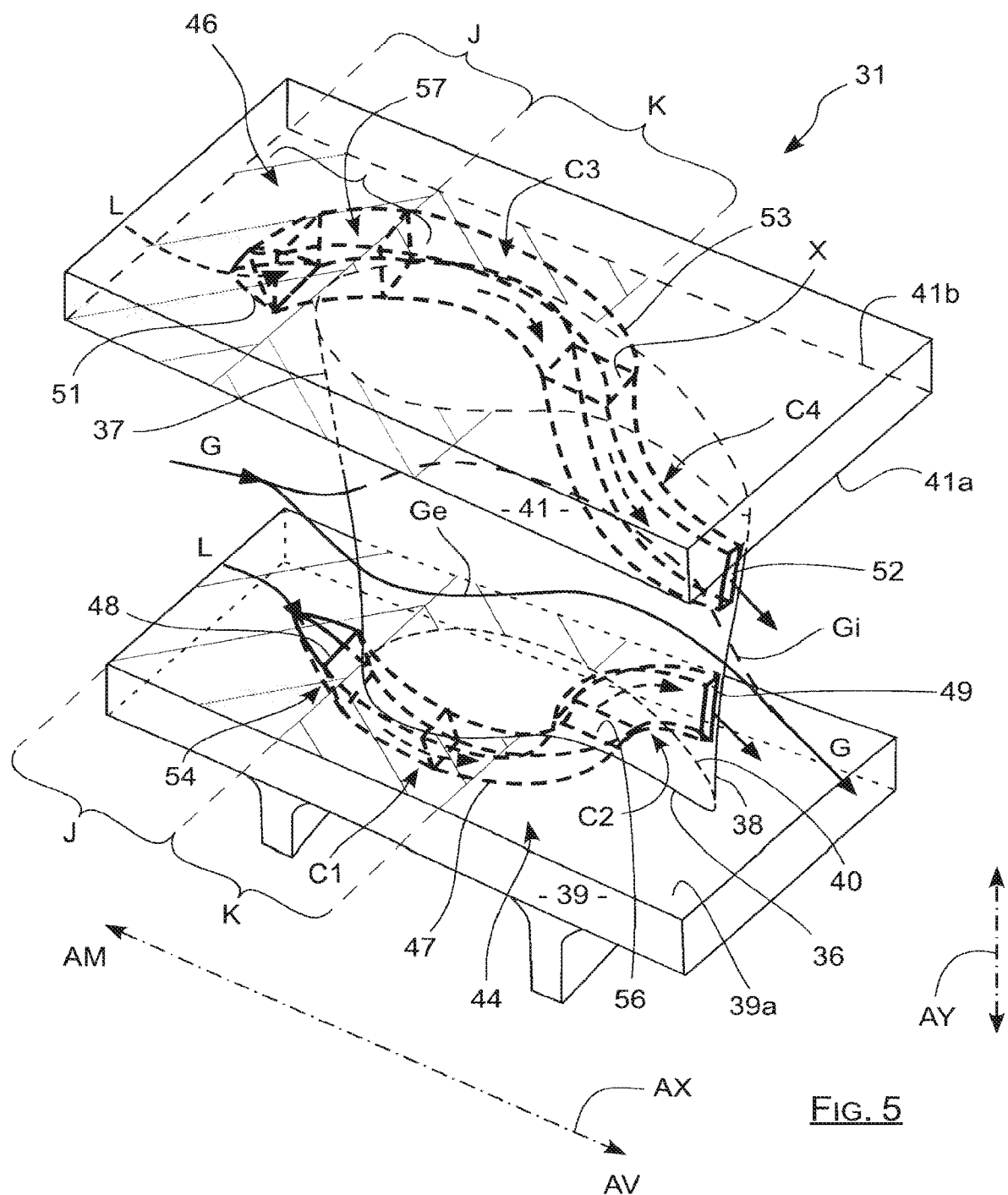
FIG. 5 is a perspective view of a vane comprising a system for reducing vortices according to the invention.

With reference to FIG. 5, this system comprises an internal air circulation circuit 44 associated with the radially internal platform 39, and an external air circulation circuit 46 associated with the radially external platform 41, these internal and external circuits 44 and 46 being volumes hollowed out in the vane with a coiled shape. The internal circuit 44 includes an internal inner conduit 47 which extends from upstream to downstream in the platform and then in the blade 34. This internal conduit 47 connects an internal air intake orifice 48 formed at the level of the upper glide face 39*a*, with an internal air discharge slit 49 opening at the level of the trailing edge 38. Similarly, the external conduit 46 includes an external air intake orifice 51 formed at the level of the lower glide face 41*a* and upstream from the leading edge 37, and an external air discharge slit 52 formed at the level of the trailing edge 38. A fluidic connection between the external orifice 51 and the external slit 52 is provided by an external inner conduit 53 extending from upstream to downstream in the radially external platform 41 then in the blade 34. The internal and external circuits illustrated in FIG. 5 each have an intake orifice provided in zone J, but it is understood that they can be formed in the zone K without leaving the scope of the invention.

In the description hereinafter, the internal and external circuits 44 and 46 will be described in the upstream-downstream direction, in other words from the leading edge to the trailing edge, and particularly with regard to the propagation direction of the flow therein, represented schematically by arrows, which is determined by the morphology thereof.

Extending from the internal orifice 48, the internal conduit 47 forms an internal ramp 54 directed towards the attachment face 39b, in other words which moves away from the glide face 39a, and of low inclination with the glide face 39a. This arrangement allows head losses liable to limit the air flow rate introduced into the conduit via the internal orifice 48 to be limited. Then, this internal conduit 47 have a first curvature C1, of concave shape viewed from the opposite external platform 41, extending radially towards the blade 34 until it traverses the glide face 39a, at the level of a zone referenced by 56, and develops within this blade. Finally, a second curvature C2 of convex shape viewed from the external platform 41 is provided to rectify the air flow so that it opens onto the trailing edge substantially along the overall propagation direction G characterised in the downstream vicinity thereof. Some degrees of deviation are tolerated, preferably with a maximum deviation of 10° with respect to the overall propagation direction G. The presence of a series of curvatures C1 and C2 marks an undulation of the internal conduit 47, in other words an inflection point, giving same the coiled characteristic thereof.

As illustrated in FIG. 5, propagation direction G in the downstream vicinity of the trailing edge denotes the resultant of the bypasses of the flow 21a on either side of the lower and upper surface walls 40 referenced respectively by Gi and Ge. As it is understood, this propagation direction in the downstream vicinity of the trailing edge is different from that measured in the upstream vicinity of the leading edge.

In the example in FIG. 5, the internal and external circuits have overall mirror morphologies, the air flow circulating in the external circuit 46 behaving in the same manner as that propagated in the internal circuit 44, viewed from the blade. Within the external platform 41, the external conduit 53 forms an external ramp 57 provided extending from the external orifice 51 and directed towards the attachment face 41b, in other words which moves away from the glide face 41a. In the same way as for the internal ramp 54, this external ramp 57 advantageously has a low inclination with the glide face 41a. The external conduit 53 forms a first curvature C3, of concave shape viewed from the opposite internal platform 39, extending radially towards to the glide face 41a extending from the external ramp 57. It then traverses the glide face 41a, at the level of a zone referenced by 58, before forming a second curvature C4 of convex shape viewed from the internal platform 39. This curvature C4 is provided to rectify the flow until it reaches the external slit 52 by orienting it substantially along the overall propagation direction G in the downstream vicinity of the trailing edge, preferably with a maximum deviation of 10°. In the same way as in the case of the internal circuit 44, this series of curvatures C3 and C4 gives the external conduit 53 the coiled characteristic thereof.

Insofar as the pressure established at the trailing edge is lower than at the leading edge, a natural intake phenomenon of the flow through the intake orifices 48 and 51 ensues. This aspect means that the internal and external circuits 44 and 46 are self-sufficient, giving the system for reducing vortices a passive operation which represents a significant advantage compared to a so-called "active" system requiring external intervention.

In concrete terms, the invention allows the boundary layer L to be isolated in the stationary vane 31, the source of the appearance of secondary phenomena, which initially flows over the platforms 39 and 41, to subsequently reintroduce same into the trailing edge 38 zone in the primary flow 21a which was depleted thereof. It is herein understood that this reintroduction of air, occurring substantially in the propagation direction G and before the primary flow 21a reaches the following rotary vane 28 in the path, will therefore contribute fully to the rotation of this vane. With this solution, the added gain on the turbine efficiency is significant, the primary flow being used in its entirety while being less subject to parasitic vortices which disperse the energy.

In the example in FIG. 5, the internal and external circuits have a similar morphology, with a conduit connecting an intake orifice provided in zone J and a discharge slit on either side of the blade along the axial direction AX. However, the invention could consider a different arrangement once it is permitted to convey the air, initially flowing at the level of the platforms, via the vane to be reinjected into the path.

Figure 6:
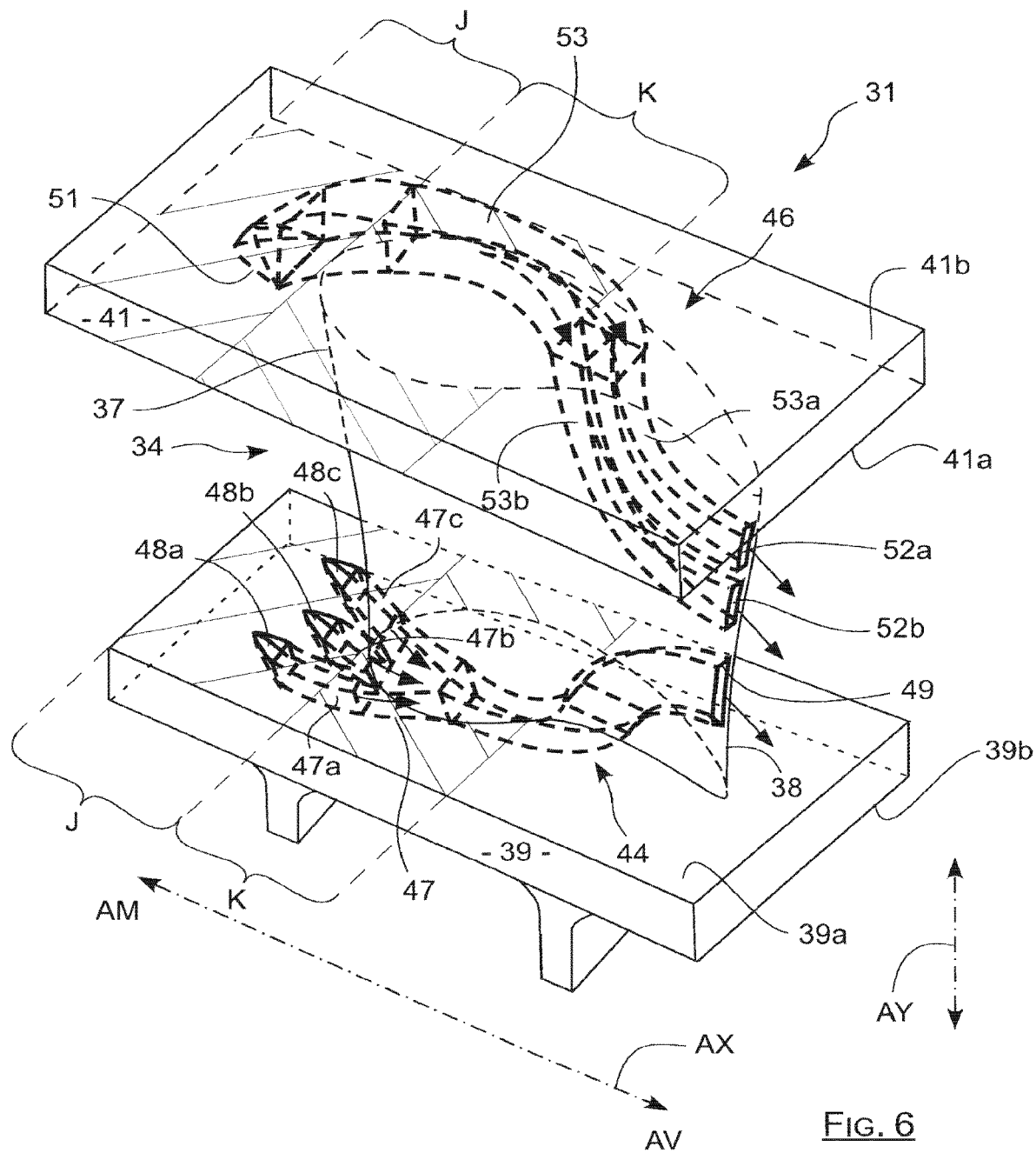
FIG. 6 is a perspective view of a vane comprising a system for reducing vortices according to an alternative embodiment of the invention.
Figure 7:
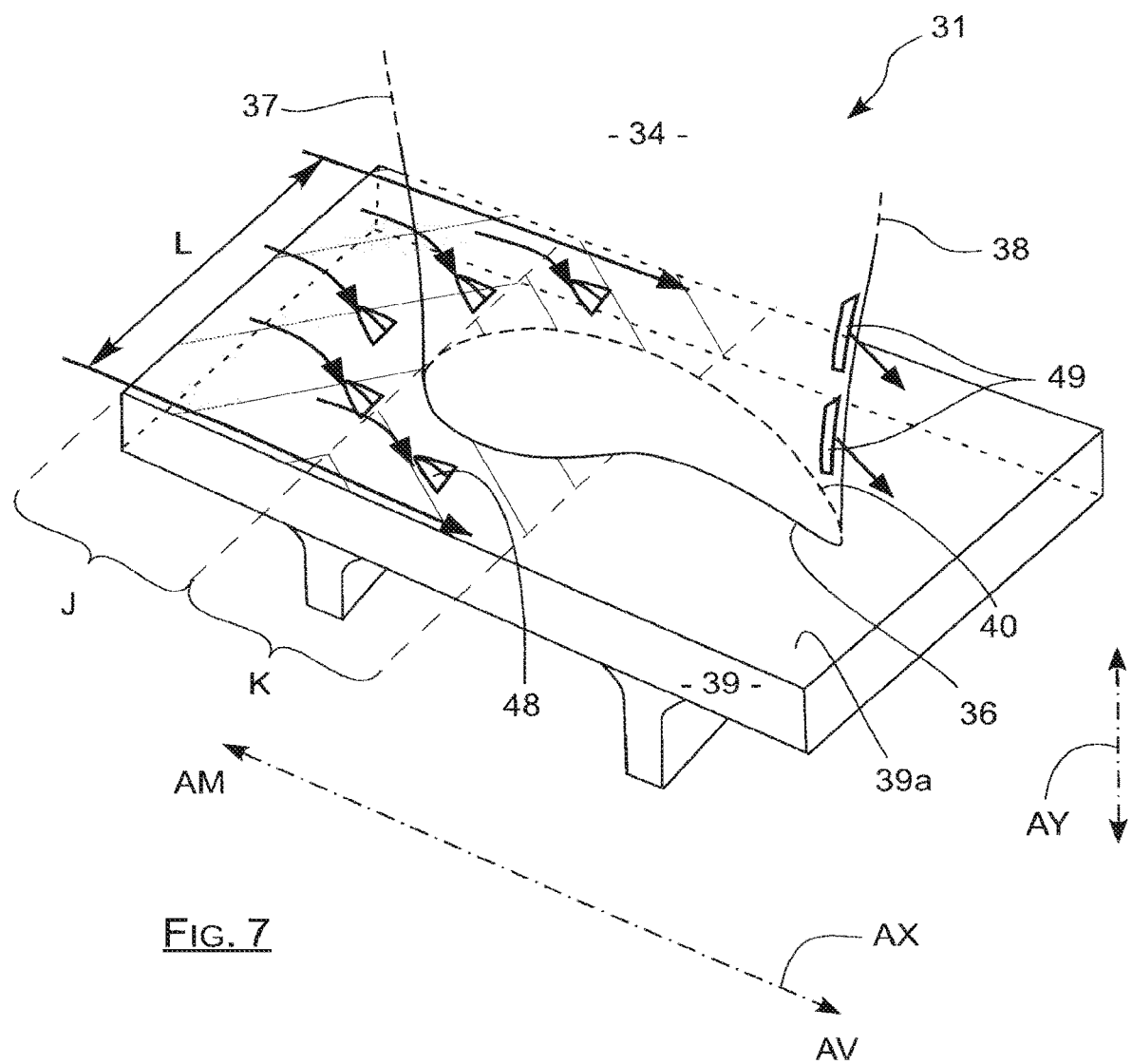
FIG. 7 is a detailed view of a fan-shaped distribution of air intake orifices according to an alternative embodiment of the invention.

In this regard, according to an alternative embodiment of the invention, as illustrated in FIG. 6, a circuit can have a plurality of intake orifices, herein associated in an non-limiting manner with the internal circuit 44 and three in number provided in zone J. These intake orifices, referenced by 48a, 48b and 48c, are advantageously distributed in staggered rows on the glide face 39a to effectively collect the air flow adjacent to this face. The internal conduit includes three branches 47a, 47b and 47c each associated with an intake orifice. A further specificity consists of forming several discharge slits along the trailing edge, herein associated in a non-limiting manner with the external circuit 46 and referenced by 52a and 52b. For this purpose, the external conduit 53 is split into two passages 53a and 53b each opening onto a slit. It is understood also that a mixed arrangement can be selected without leaving the scope of the invention, with the possibility for a circuit of having several intake orifices as well as several discharge slits. It should be noted also that such a vane could include several circuits at the level of a single platform without leaving the scope of the invention, these circuits being capable of being independent or connected together. Similarly, the invention could consider an internal circuit and an external circuit intersecting in the blade 34. Finally, in the case of a plurality of intake orifices associated with a circuit, the latter can be distributed entirely in the zone J, entirely in the zone K, or indeed with one part in the zone J and the other part in the zone K. In the case of the latter alternative, the invention advantageously considers a fan-shaped arrangement as illustrated in FIG. 7, in a non-limiting manner at the level of the internal platform 39, to sweep a large proportion of the boundary layer L and thus capture maximum current lines.

In practice, the morphology and the sizing of each of the circuits directly determine the air flow rate conveyed thereby. In this regard, these parameters are determined according to the specific case, with regard particularly to the predefined location of the blade in the path, in order to tend towards the most optimised system. The invention could particularly consider an inner conduit comprising more than one undulation, in other words more than two curvatures, particularly if it involves adapting the shape of this conduit to a specific size within the blade and or the platform.

The circuits can be embodied using cores in the case of foundry manufacture. Nevertheless, due to the shape complexity of the internal and external circuits 44 and 46, the invention advantageously considers the use of additive manufacturing to manufacture the vane, in a non-limiting manner by laser-powder bed metal fusion. Preferentially, the blade and the platforms are manufactured in one piece with volumes hollowed out thereof delimiting the circuits.

In the above description, the system for reducing vortices has been explained in the case where it is an integral part of a stationary stator vane 31. It should however be noted that such a system could also be applied in a rotary vane, without leaving the scope of the invention. Such a rotary vane 28 comprises a blade generally ending with a platform, the boundary layer flowing over this platform also being subject to vortex phenomena.

Obviously, with respect to the air intake orifices and air discharge slits, the invention is not limited to these specific descriptions and allows any type of shape once they respectively form air intake openings formed in the platform and air discharge openings provided in the blade. These openings can have for example an ovoid, rectangular, triangular, parallelepipedal, conical, prismatic cross-section, or any other shape that could be considered by those skilled in the art.

The invention claimed is:

1. A turbine vane for a turbine engine, comprising:
   a blade including a leading edge and a trailing edge and intended to be submerged in an air flow circulating from upstream to downstream from the leading edge to the trailing edge;
   a platform ending an end of the blade, the platform comprising an air glide face at the interface thereof with the blade; and
   an air circulation circuit including:
      an air intake opening formed onto the glide face of the platform, in a zone upstream from the leading edge or in a zone corresponding to the upstream half of the blade;
      an air discharge opening formed onto the trailing edge of the blade; and
      an inner conduit connecting the air intake opening to the air discharge opening.

2. The vane according to claim 1, wherein the inner conduit forms a coil including at least one undulation.

3. The vane according to claim 1, wherein the air intake opening is an orifice, and the air discharge opening is a slit.

4. The vane according to claim 1, wherein the inner conduit is configured to discharge air via the air discharge opening along a direction which is within 10° of a direction of a propagation of the air flow along the blade, downstream from the trailing edge.

5. The vane according to claim 1, wherein the inner conduit connects a plurality of air intake openings to an air discharge opening.

6. The vane according to claim 1, wherein the inner conduit connects an air intake opening to a plurality of air discharge openings.

7. The vane according to claim 1, comprising a radially internal platform and a radially external platform, and comprising a first air circulation circuit at the level of the radially internal platform, and a second air circulation circuit at the level of the radially external platform.

8. The vane according to claim 1, obtained by additive manufacturing.

9. A turbine for an aircraft turbine engine comprising at least one vane according to claim 1.

10. An aircraft turbine engine comprising at least one turbine according to claim 9.

11. The turbine according to claim 9, wherein the turbine is a low-pressure turbine.

12. The aircraft turbine engine according to claim 10, wherein the turbine engine is a double-body turbine engine.

13. The vane according to claim 1, wherein the inner conduit includes a first curvature, of concave shape viewed from an opposite platform located on an end of the blade opposite to the platform, extending radially toward the blade until the inner conduit traverses the guide face, and a second curvature of convex shape viewed from the opposite platform, the second curvature configured to rectify air discharged from the air discharge opening along a direction of a propagation of the air flow along the blade.

* * * * *